United States Patent [19]
Rybicki et al.

[11] Patent Number: 5,630,081
[45] Date of Patent: May 13, 1997

[54] CONNECTION RESOURCE MANAGER DISPLAYING LINK-STATUS INFORMATION USING A TRAFFIC LIGHT ICONIC REPRESENTATION

[75] Inventors: Steve G. Rybicki, Mountain View; Dale L. Palmer, Fremont, both of Calif.

[73] Assignee: Puma Technology, Inc., San Jose, Calif.

[21] Appl. No.: 525,836

[22] Filed: Sep. 7, 1995

[51] Int. Cl.$^6$ .................................................. G06F 15/00
[52] U.S. Cl. ........................................ 395/348; 395/349
[58] Field of Search ................................. 395/155, 157, 395/159, 161

[56] References Cited

U.S. PATENT DOCUMENTS

| | | | |
|---|---|---|---|
| 5,109,483 | 4/1992 | Baratz et al. | 395/200 |
| 5,113,517 | 5/1992 | Beard et al. | 364/200 |
| 5,243,697 | 9/1993 | Hoeber et al. | 395/156 |
| 5,276,801 | 1/1994 | Heyen et al. | 395/162 |
| 5,280,541 | 1/1994 | Marko et al. | 379/61 |
| 5,301,348 | 4/1994 | Jaakelainen | 395/800 |
| 5,319,363 | 6/1994 | Welch et al. | 340/825.36 |
| 5,321,800 | 6/1994 | Lesser | 395/140 |
| 5,365,360 | 11/1994 | Torres | 395/159 |
| 5,371,897 | 12/1994 | Brown et al. | 395/800 |
| 5,377,318 | 12/1994 | Wolber | 395/159 |
| 5,392,207 | 2/1995 | Wilson et al. | 364/167.01 |
| 5,392,328 | 2/1995 | Schmidt et al. | 379/10 |
| 5,414,809 | 5/1995 | Hogan et al. | 395/155 |
| 5,475,811 | 12/1995 | Neumann et al. | 395/155 |
| 5,504,921 | 4/1996 | Dev et al. | 395/800 |

OTHER PUBLICATIONS

Hewlett–Packard JetAdmin Printer Management Software Brochure, Jul. 1995? Hewlett Packard Co.
Compuserve Information Manager for Windows (WinCIM), Quick Start Guide, pp. 12–14, 1994.
LapLink Pro User's Guide, Traveling Software, 1991, p. 12–27.
LapLink for Windows User's Guide, Traveling Software, 1994, pp. 8–33.

*Primary Examiner*—Mark R. Powell
*Assistant Examiner*—Ba Huynh
*Attorney, Agent, or Firm*—Stuart T. Auvinen

[57] ABSTRACT

A communication and file-transfer program can be used to link a portable computer to a remote computer. The portable-computer link program displays on a user's screen a dynamic icon. The dynamic icon changes appearance as a connection to a remote computer is made, thus indicating to the user the progress of making the connection. Since most users of the portable-computer link program are not communications experts but casual business users, the dynamic icon employs the universally-known paradigm of a traffic light. The traffic light icon dynamically changes appearance from red to yellow to green as the communications link is being established. The red light indicates that no data is able to be transferred, such as when the media link is not plugged in or not configured. The yellow light indicates that some data is being transferred over the media link, although data errors may be occurring. The green light signals that file transfers may proceed across the connected link. The program runs under the Windows O/S, and includes a connection establish module called by a connection resource manager to open a connection. The connection establish module notifies the connection resource manager of activity, which then may cause a traffic light controller module to update the traffic light icon in the frame buffer of the video subsystem. Once the connection is made, a data transfer engine is used for file transfer.

20 Claims, 7 Drawing Sheets

CONNECTION RESOURCE MANAGER DISPLAYING LINK-STATUS INFORMATION USING A TRAFFIC LIGHT ICONIC REPRESENTATION

BACKGROUND OF THE INVENTION—FIELD OF THE INVENTION

This invention relates to user interfaces with computers, and more particularly for communication programs having an intuitive user interface.

BACKGROUND OF THE INVENTION—DESCRIPTION OF THE RELATED ART

The personal computer revolution has placed computers in the offices and briefcases of business travelers. Portable computers known as laptop, notebook, or palm-top PC's allow the traveler to continue working while on the road or on the plane. Upon returning to the office, files created or modified on the portable PC must be transferred to a desktop computer at the office. Special software programs have been designed for transferring and synchronizing files between a portable and a stationary desktop computer. One such program is marketed under the name "LapLink™" by Traveling Software, Inc. of Bothell, Wash.

One feature of these communication programs is that the communication link between the portable and the stationary desktop computer is temporary. While local-area networks (LAN's) typically connect desktop computers together for communication and file transfer, the connection is semi-permanent and is not ordinarily broken. A specialized network technician is often called to physically connect computers with twisted-pair or other cabling, and to configure the communication software and establish the logical connection between computers. Thus the end user does not configure or establish the permanent connections for networks.

In contrast, portable-computer link programs connect the portable computer to the stationary desktop computer for a short, temporary period of time. The end user makes the physical connection and must configure the physical link and establish the connection. Portable-computer link programs must therefore be easy enough for an untrained business user to use. The physical connection is made and re-established many times each month or week. The end user rather than a trained technician must be able to make this connection and configure the software before files may be transferred.

Many problems can prevent a connection from being established. The communication link may fail to be established for reasons as simple as a cable not being snugly plugged in to a connector on the back of a PC, to as complex as baud rate mismatch or different handshake protocols being configured. The end user must determine what the problem is and correct it before the link can be established and files can be transferred.

Current commercial programs provide little or no help to the user to help establish the link. Indeed, the programs pause while attempting to make the connection, leaving the user wondering if the computer has crashed. When a link failure occurs, a dialog box eventually pops up, displaying a cryptic message such as 'the connection has been terminated by the remote machine.' Since the end user is not a communication expert, this message may provide little help in resolving the problem. If the link is established, no display is shown other than a small triangle next to the name of the remote computer, or two triangles when a previously-established link is broken, as does the DOS version 4.0 of LapLinkPro™. A newer version 6.0 of LapLink™ for Windows shows even less link status information.

What is desired is a portable-computer link program which displays meaningful information about the status of the communication link to the user. It is desired to tightly couple the display to the program modules of the link program. It is also desired to provide readily-understandable visual feedback to users who are not communications experts. It is desired to use a common, everyday paradigm from outside the world of computers that every business traveler is familiar with. It is further desired to map the various stages or steps in establishing a connection between computers to this outside paradigm so that progressive information about the status of establishing the link is communicated to the end user by a quickly-understood visual display.

SUMMARY OF THE INVENTION

A method for establishing a connection from a local computer to a remote computer includes the computer-implemented step of displaying to a user an icon on a display screen on the local computer. The icon has a first appearance. A communications port on the local computer is configured. The communications port is for coupling to a link media for transferring data between the local computer and the remote computer. An attention packet is transmitted out of the communications port of the local computer and the icon is changed to a second appearance. The second appearance is distinct from the first appearance so as to indicate to the user that a connection attempt is being made.

The appearance of the icon is changed to a third appearance if a response packet is successfully received at the communications port from the remote computer. The third appearance is distinct from the first and second appearance so as to indicate to the user that a connection has been made. However, the appearance of the icon is changed back to the first appearance if a response packet is not successfully received at the communications port from the remote computer, indicating that no connection has been made.

Thus progress of establishing the connection is displayed to the user by changing the appearance of the icon.

In further aspects of the invention the connection from the local computer to the remote computer is temporary and the link media is connected to the communications port by an end user. The connection is capable of being disconnected and re-established many times in a month. The first appearance of the icon is an image of a traffic light with a red light brightened, the second appearance of the icon is an image of a traffic light with a yellow light brightened, and third appearance of the icon is an image of a traffic light with a green light brightened.

In other aspects the invention is a computer-program product having a computer-usable medium with computer-readable program code means embodied therein for establishing a connection between a local and a remote computer. The computer-readable program code means in the computer-program product has connection means for establishing a connection between the local and remote computers. The connection means includes means for transmitting an attention packet and means for transmitting a response packet in response to the attention packet. An icon display means generates an image of an icon for display to a user on a display screen while connection progress monitoring means, which is coupled to the connection means and coupled to the icon display means, monitors the progress of establishing the connection. It updates the appearance of the icon to indicate to the user the progress of establishing the connection.

The image of the icon for display to the user is tightly coupled to the connection means through the connection progress monitoring means. It reports to the user the status of establishing the connection through the updating the appearance of the icon.

In further aspects the icon is an image of a traffic light. The appearance of the icon is updated from a red light to a yellow light when the connection means attempts to make a connection, and the appearance of the icon is updated from the yellow light of a green light when the connection means has established the connection.

DETAILED DESCRIPTION

The present invention relates to an improvement in user interfaces for communications programs. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

INTUITIVE USER INTERFACE—FIG. 1

A common paradigm is the simple traffic light. This paradigm is especially well understood by business travelers, since they encounter many stoplights while traveling. Thus the traffic light paradigm is well-understood by the primary market of the portable-computer link program. Since traffic lights are used around the world, the paradigm is understood internationally. Both of these factors decrease confusion and increase marketing appeal for the portable-computer link program.

The traffic light controls the flow of traffic through an intersection in a similar way to the portable-computer link program controlling the establishment of a connection between computers. The red light indicates that no cars pass through the intersection, while the red indicator icon shows that no data can pass between the computers. The green light indicates that cars may freely pass through the intersection; the green indicator icon shows that data may be freely transferred between computers. The yellow light indicates caution, that cars may no longer freely cross the intersection. Cars that are already in the intersection may continue on, but cars not yet in the intersection must stop. The yellow indicator icon shows that some data is being transferred, but complete files may not yet be transferred. The data being transferred under the yellow icon is test data used to establish the connection. This data may not be received properly, in which case the link is not working properly, although the physical connection is intact. Yellow thus indicates to the user that the cable is properly connected, and to now adjust the connection parameters in the software. If the data is received properly, then the icon can change to green, and data files may then be freely transferred.

Figure 1:
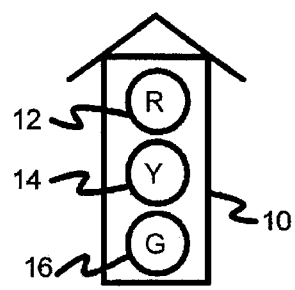
FIG. 1 shows the traffic light icon displayed on a computer screen.

FIG. 1 shows the traffic light icon displayed on a computer screen. This icon 10 dynamically changes when the portable-computer link program updates display 20 as the status of the communication link changes. One of the three colored lights is brightly lit—either the red, yellow, or green lights 12, 14, 16. FIG. 1 shows red light 12 being lit brightly, indicating that the link media are not connected and no data is able to cross the link. Yellow light 14 is brightly lit and red light 12 is dimmed when some data is able to cross the communications link, as when the connection is being established and test data is being transferred. Green light 16 is brightly lit and yellow light 14 is dimmed when the portable-computer link program determines that the test data is good, and file data may be freely transferred by the user.

TEMPORARY LINKS TO PORTABLE PC—FIG. 2

Figure 2A:
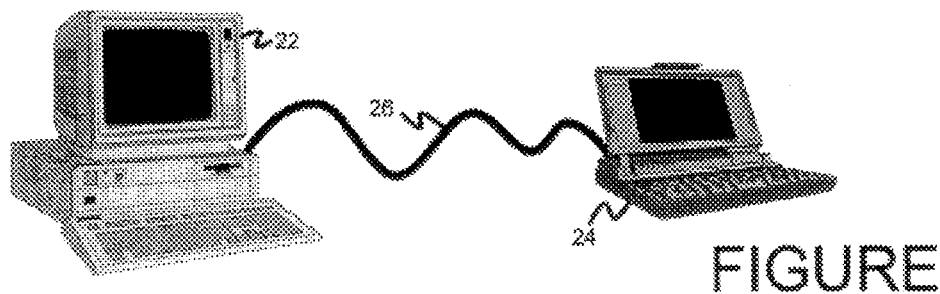
FIG. 2 shows that the communications link can use several types of physical media.

FIG. 2 shows that the communications link can use several types of physical media. In FIG. 2A, desktop computer 22 is physically connected to portable computer 24 by cable 26. Cable 26 plugs into connectors on the back of desktop computer 22 and portable computer 24. These connectors are typically DB25 connectors with 25 pins for parallel cables and some serial cables, or DB9 connectors with 9 pins for serial cables. Serial cables have just one data signal line and one clock line, while parallel cables have eight data signal lines as well as clock or strobe lines. Many power and ground lines connect to the 9 or 25 pins to isolate the signal lines from each other and reduce interference. The serial cable connects to the serial port connector while the parallel cable connects to the parallel or printer port connector of computers 22, 24. The user merely has to plug the connectors at the ends of cable 26 into the proper type of connectors on the backs of computers 22, 24 to make a physical connection.

Figure 2B:
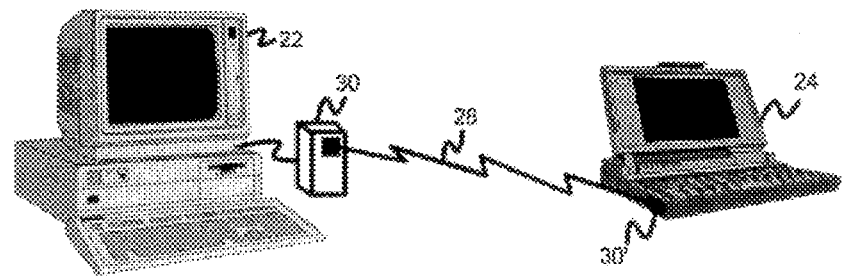

FIG. 2B highlights a communications link using a wireless physical link. Infrared transmitter/receiver 30 is connected to desktop computer 22, while another infrared transmitter/receiver 30' is included as an integral part of portable computer 24. Of course, desktop computer 22 could also have an IR receiver/transmitter as an integral part of its housing, while a separate external IR unit could be connected to portable computer 24. Data is transmitted not over wires but through the air using infrared transmission 28. Current technology allows the two IR units 30, 30' to be separated by about 3 meters before communication fails. Another technology which may be used with the invention for wireless communication is radio-frequency transmission (RF).

Figure 2C:
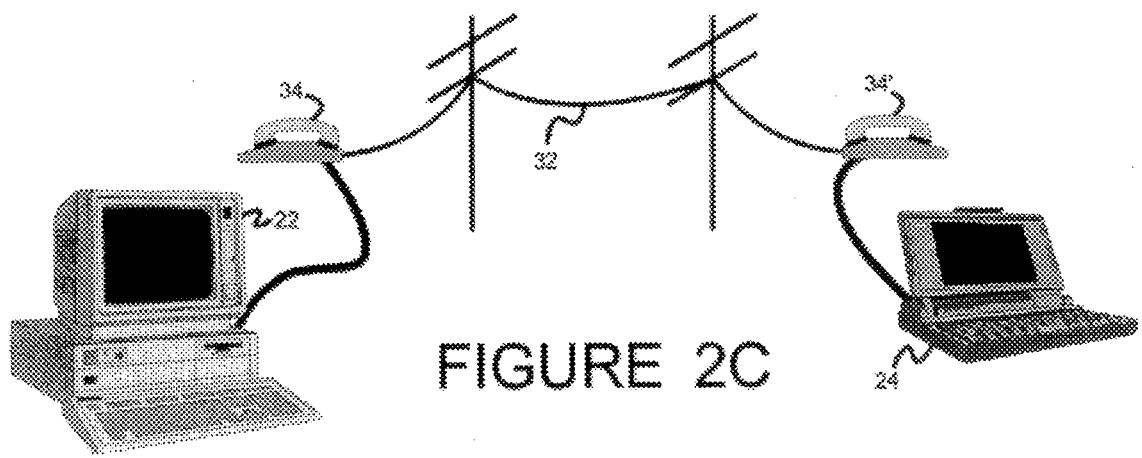

FIG. 2C shows a communication link using telephone lines and modems. Desktop computer 22 is connected to modem 34 either using the serial port, or modem 34 may be located on a bus expansion card within desktop computer 22. Modem 34 generates dialing pulses to connect to modem 34' over telephone lines 32. Modem 34' is connected to portable computer 24, or is an integral part of portable computer 24. Modems 34, 34' convert digital data from computers 22, 24 to analog signals which may be transmitted over telephone lines 32. Newer digital modems can transmit digital rather than analog signals over telephone lines 32 when digital telephone lines such as ISDN are available.

PC HARDWARE ARCHITECTURE—FIG. 3

Figure 3:
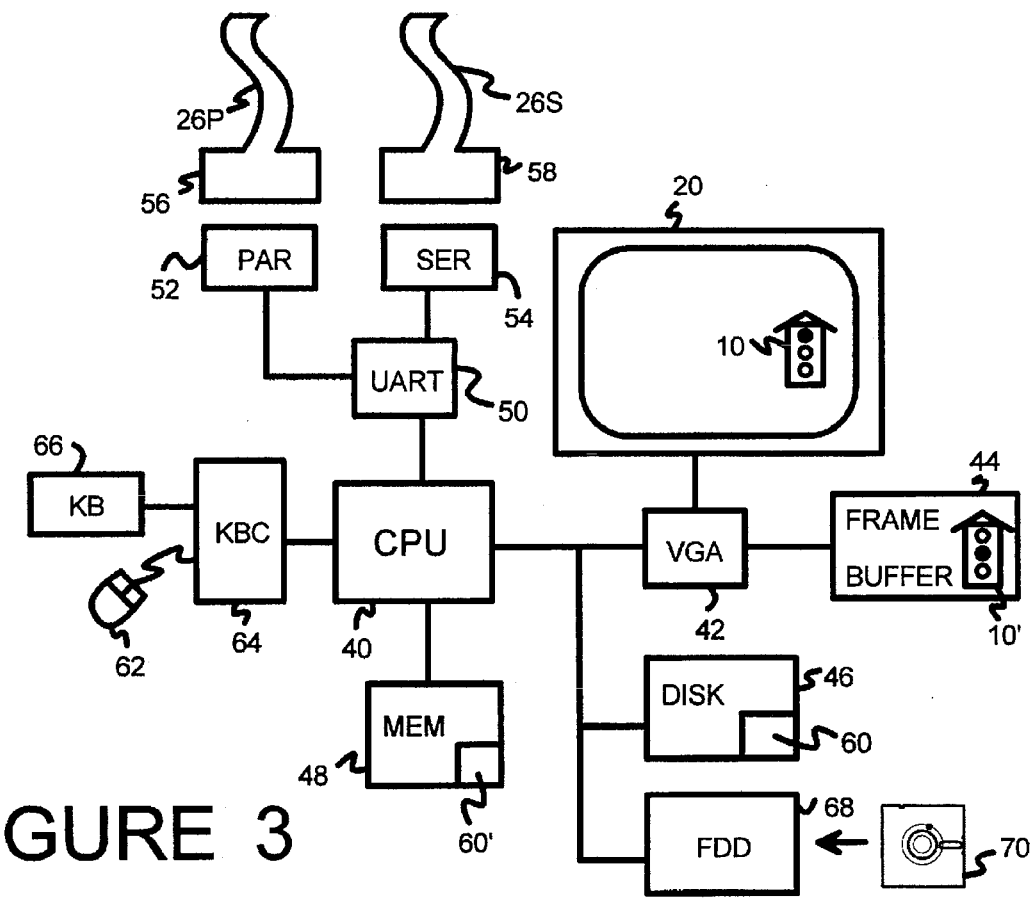
FIG. 3 is a typical computer employing the traffic light communications controller.

FIG. 3 is a typical computer employing the traffic light communications controller. Computer 22 is connected to display 20, which may be a CRT monitor or a flat-panel display commonly used on portable computers. Icon 10 appears to be a traffic light which is displayed on display 20. A portable-computer link program 60 resides on disk 46 and is transferred to main RAM memory 48 by an operating system. Once a copy 60' of a portion of portable-computer link program 60 is loaded into RAM memory 48, then instructions from the copy 60' of portable-computer link program 60 may be fetched to central processing unit (CPU) 40 and executed. Execution of this program causes display data to be written to graphics controller 42 and to frame buffer 44, which contains a bitmap of the pixels displayed on display 20. Thus to update icon 10, a new image of icon 10 is written under program 60 control from CPU 40 to frame buffer 44. This new image 10' of icon 10 may have a different color light brightly lit than the previous icon 10 that was displayed. The next refresh of display 20 writes the new image 10' from frame buffer 44 to display 20.

Portable-computer link program 60 may initially be copied from diskette 70 to hard disk 46 using floppy disk drive 68 under control of an operating system. Other machine-readable media beside floppy diskette 70 may be used to transport portable-computer link program 60 to computer 22. A CD-ROM which is readable by computer 22 may be used if a CD-ROM drive is provided (not shown). Indeed, portable-computer link program 60 may even be copied as a data file across a communication link such as described for FIG. 2. The program code of the portable-computer link program 60 is initially in a compressed format on some of the media, but is de-compressed before execution of the program.

When executing on CPU 40, portable-computer link program 60 uses Universal Asynchronous Receiver Transmitter (UART) 50 to send data to and receive data from serial port 54 and parallel port 52. A simple register may also be used in place of UART 50, especially for parallel port 52. Parallel cable 26P has 25-pin connector 56 which plugs into a connector for parallel port 52. Serial cable 26S has 9-pin connector 58 which plugs into a connector for serial port 54.

The user supplies inputs to CPU 40 using keyboard 66 and mouse 62, which connect to keyboard controller 64 acting as a simple UART that transmits key codes to CPU 40 which are processed by an operating system. The operating system then sends these key codes to the copy 60' of portable-computer link program 60.

WINDOWS SOFTWARE ARCHITECTURE— FIGS. 4, 5

The portable-computer link program is designed to run under the Microsoft Windows™ operating system. Windows™ provides a rich collection of software tools known as the Windows™ application programming interface (API). The API is a collection of software routines or functions, along with data structures, data types, files, and statements. Application programmers use these API functions to build much of their application, rather than building their application entirely from simple programming-language statements such as C or Pascal statements. Over 500 functions are provided in the Windows™ API. These functions control the appearance of the display, including windows, menus, and icons. Messages may also be passed from the Windows™ operating system to these applications, and between different program modules within these applications using the Windows Manager Interface (WMI). These messages may include status information from the communications ports.

The API also includes a subset of functions known as the Graphics Device Interface (GDI). The GDI draws images into the frame buffer so that they may be displayed on the monitor or screen. GDI provides a device-independent interface to application programs through functions that draw lines, text, and bitmap images. These images are then converted by a Windows device driver into a device-specific format and the converted image is copied to the frame buffer.

Another subset of API functions is known as the System Services Interface (SSI). These functions control system resources and can generate sounds with the speaker, manage the RAM memory and files on disk, and I/O ports. The SSI functions which control the I/O ports include functions to read and write data to the serial and parallel ports, and to any modems connected to the serial ports or an expansion bus.

A subset of the SSI API communicates with the communication ports. This Windows Comm SSI API includes API functions such as OpenComm, which opens and initializes a communications port, CloseComm, which releases an open communications port so that other applications may use it, ReadComm and WriteComm to read and write data to the open communications port, and GetCommError which reads a status register for the communications port to determine what kind of error, if any, is present. This status register can be a hardware register in UART 50, or a soft register or status flag stored by the Windows O/S. Each API function can have many parameters to specify which communications port and settings for the port, as well as data. Thus the application can send or receive data from the serial and parallel ports by calling one of these SSI API functions rather than communicate directly with the hardware port or UART.

The portable-computer link program uses the Comm SSI API's to configure and control the communications ports. The graphics GDI API is used by the portable-computer link program to update the traffic light icon on the display. The link program tightly couples the displayed traffic light icon to the status of the communications port.

Figure 4:
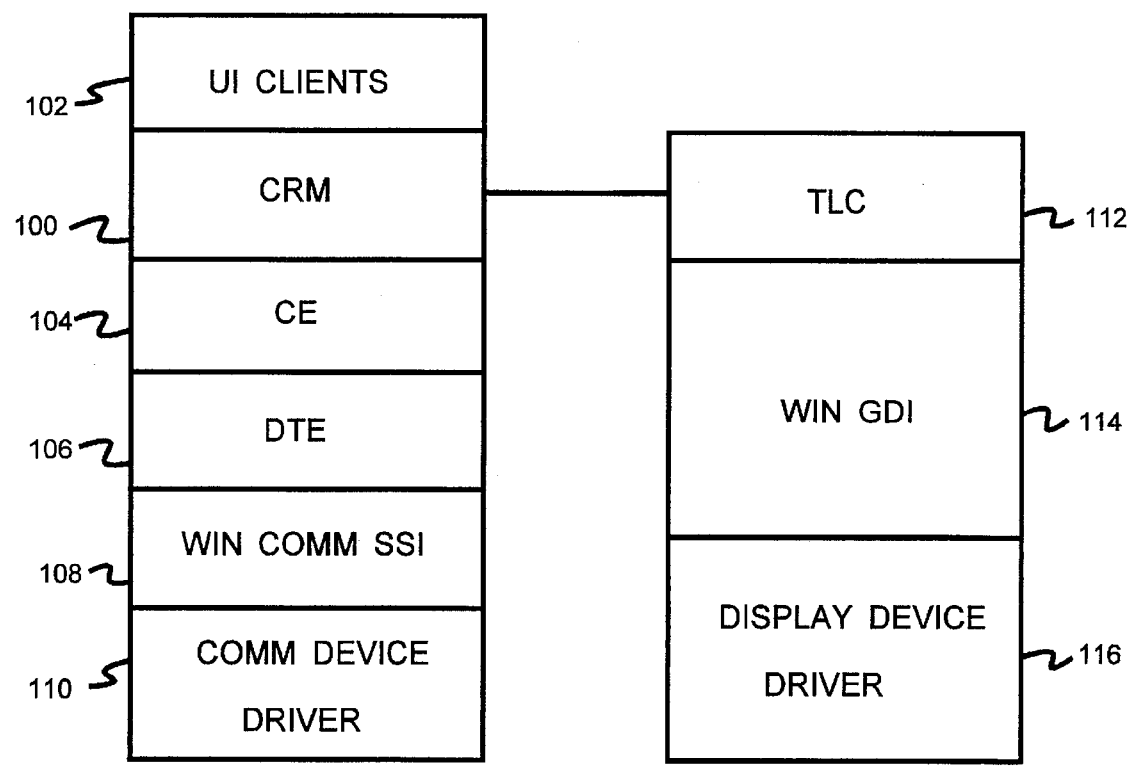
FIG. 4 is an architectural diagram of the layers of software used by the portable-computer link program.

FIG. 4 is an architectural diagram of the layers of software used by the portable-computer link program. Upper layers represent software modules which receive input from the user, while lower layers represent software which communicates with the hardware. The link program includes software modules for the user-interface clients 102 (sometimes called the front-end), the connection resource manager 100, the connection establish module 104, the data transfer engine 106, and the traffic light controller 112, Lower layers are included in the Windows operating system, including the Windows Comm SSI 108 and the Windows graphics device interface 114, and the device-dependent drivers which communicate with the hardware itself. The Comm device driver 110 is contained in a file such as comm.drv, while the display device driver 116 is specific to the type of display on the computer. Comm device driver 110 may be replaced by a higher-performance device driver included with the portable-computer link program and may be contained in a file such as pcomm.drv.

Two stacks of layered software modules are shown in FIG. 4, since connection resource manager 100 and traffic light controller 112 are tightly coupled so that the display can be driven to indicate progress in establishing a communications link using the Comm software modules and drivers.

Figure 5:
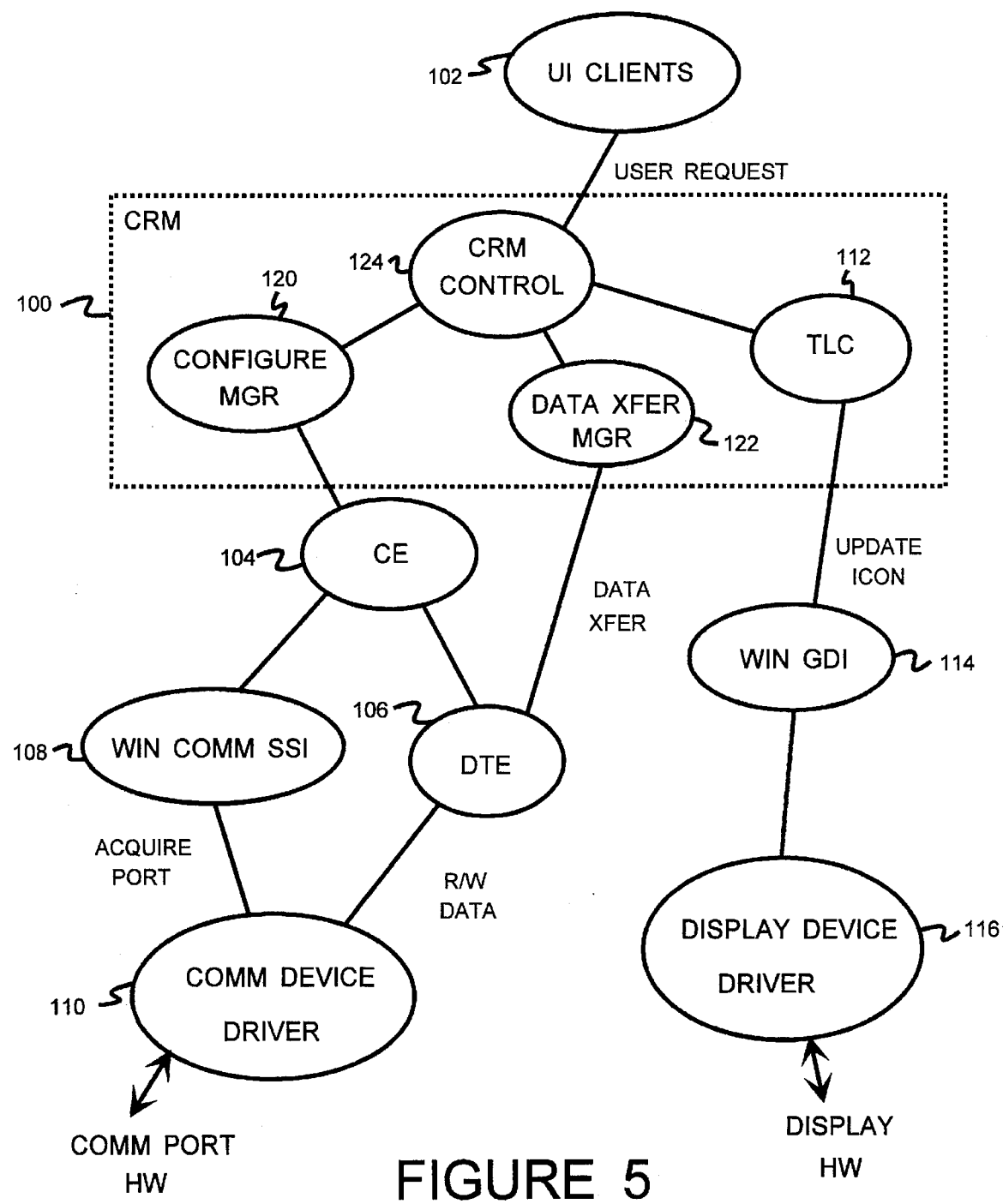
FIG. 5 is a software entity diagram illustrating the interfaces between the different software modules in the portable-computer link program and the Windows O/S.

FIG. 5 is a software entity diagram illustrating the interfaces between the different software modules in the portable-computer link program and the Windows O/S. User-interface clients 102 receive mouse clicks, movements, or keyboard presses from the user, which are received from lower-level Windows drivers and API's for the mouse and keyboard (not shown) as is well-known in the art. The user's mouse clicks are interpreted by user-interface clients 102, which send requests to lower-level software layers to perform the functions requested by the user. User-interface clients 102 may call an interface function to connection resource manager 100, such as a function to make a connection with a remote computer. This interface to the connection resource manager 100 is a proprietary API that is defined by the programmer of the link program, rather than an interface defined by the Windows O/S itself. (See Appendix)

Connection resource manager 100 is composed of several modules. Configure manager 120 controls configuring the communications ports, while data transfer manager 122 oversees file transfers over the communication link. CRM control 124 receives function calls and requests from user-interface clients 102 and passes appropriate instructions along to lower-level software modules, such as configuration requests to configuration manager 120 or file transfer requests to data transfer manager 122. CRM control 124 also keeps track to the status of the communication link and passes this information to traffic light controller 112.

Traffic light controller 112 updates the iconic representation when a transition to another color light occurs. Three bit-mapped images of the traffic light icon may be used, one for each color light—red, yellow, green. Alternately, just the lights themselves may be re-drawn with a bright or dim attribute to change the traffic light. Traffic light controller 112 uses standard Windows GDI functions to instruct GDI 114 to modify the image 10' of the traffic light icon in frame buffer 44, which changes the displayed icon 10 on the next refresh of display 20. Display device driver 116 is called by GDI 114 to physically write the updated image to frame buffer 44. Some GDI API functions that can be used to change the icon include LoadBitmap, BitBlt, SelectObject, GetObject, CreatCompatibleDC, and DeleteDC.

The low-level device-dependent driver for the communications ports, the comm device driver 110, may be the comm.drv driver supplied with Windows or a higher-performance driver written by the applications programmer. Windows Comm SSI 108 communicates with comm device driver 110 and acts as a buffer between the device-specific comm device driver 110 and any Windows applications which require a device-independent API.

While connection resource manager 100 could communicate directly with Windows comm SSI 108, the portable-computer link program would suffer from the relatively low performance of the generic Windows Comm SSI 108 supplied by Microsoft. The generic Comm SSI driver only supports baud rates to 57,600. Without a FIFO, data may be lost above 9600 bps due to a bug in the generic driver. A proprietary data transfer engine 106 is instead used for file transfers from data transfer manager 122. A proprietary virtual device driver can achieve baud rates to 94,000 bps. Configuration and initialization are still performed by Windows comm SSI 108. Connection establish module 104 receives configuration information from configuration manager 120 and passes this configuration information along to Windows comm SSI 108 using the OpenComm API function. Connection establish module 104 is also used to establish or make a connection with a remote computer before any data files are transferred by data transfer manager 122. A connection state machine in connection establish module 104 sequences through the steps in establishing a connection, such as sending out attention packets to the remote computer through the communications port, and receiving response packets from the remote computer. These packets are generated by connection establish module 104 and sent to the communications port through data transfer engine 106 rather than through Windows comm SSI 108.

Once a low-level connection has been established with connection establish module 104, then a high-level connection or link is made with connection resource manager 100 again by sending packets to the remote computer's connection resource manager. Typically the same portable-computer link program including connection resource manager 100 is running on both computers when the link is made.

STATE MACHINES FOR ESTABLISHING LINK

Establishing a link occurs at two levels—first a low-level connection is made using connection establish module 104 on both the local and remote computers, and then a high-level link is made between connection resource manager 100 on both computers. Two state machines are used: one, a connection state machine in connection establish module 104 to make the low-level connection, and a second, link state machine in CRM control 124 of connection resource manager 100 to make the high-level link. The high-level link state machine in CRM control 124 temporarily passes control to the connection state machine in connection establish module 104.

Figure 6:
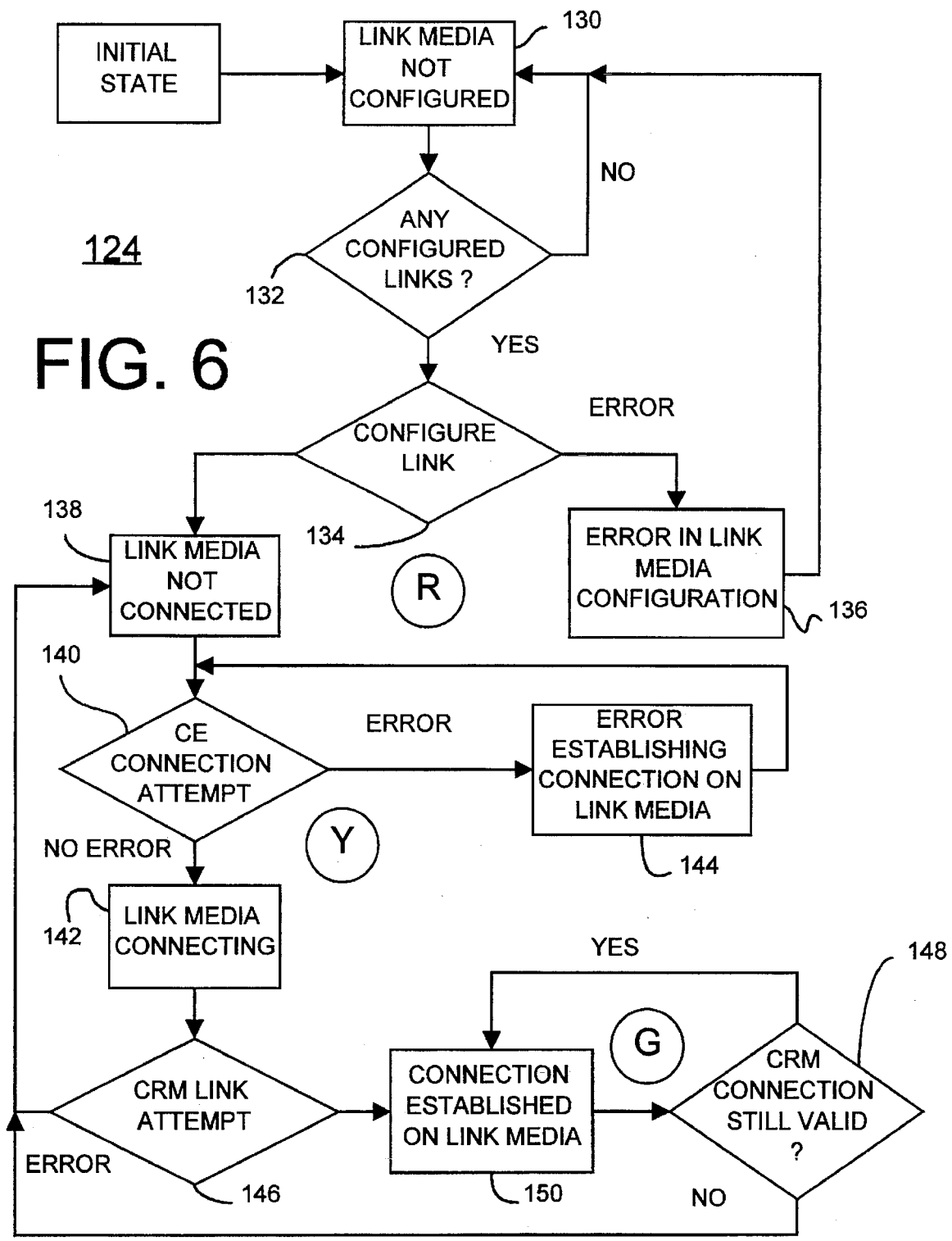
FIG. 6 shows the high-level link state machine in the Connection Resource Manager control.

High-Level Link State Machine—FIG. 6

FIG. 6 shows the high-level link state machine in CRM control 124. The state machine is initialized into the link media not configured state 130. If there are any stored configurations for communication ports, step 132, then those ports are initialized, step 134. Alternately, the user may specify the parameters and configure a new communications port. CRM control 124 instructs connection establish module 104 to send an OpenComm function call to Windows comm SSI 108 to initialize and configure the communications port (step 134). Should an error be returned, or if CRM control 124 detects an obvious configuration error, then the error in link media configuration state 136 is entered. If Windows Comm SSI 108 can successfully initialize the communications port, then link media not connected state 138 is entered.

Connection establish module 104 can then attempt to establish a low-level connection, step 140. A separate low-level connection state machine in module 104 is used to establish the connection. If an error occurs in establishing the connection, state 144 is entered. This error can occur if the media are connected but data errors occur, such as frame errors from the UART which can occur for serial cables when the baud rates do not match. Another type of error is that data packets are received, but the data's format is not recognized.

The link media connecting state 142 is entered if no hardware errors are received. At this point, the low-level connection has been made. The high-level CRM link is then attempted. The connection resource manager 100 attempts to link with the remote computer by sending data packets through data transfer manager 122 and data transfer engine 106. These data packets have a fixed format that is recognized by the remote computer's connection resource manager 100. The remote computer then sends acknowledgment packets back to the local computer. If an error occurs, such as when the data is not in the correct format, then link media not connected state 138 is entered, and the low-level connection must be re-established. If the data packets are successfully sent and received, then the connection is established on link media, state 150. Periodically the connection is checked, step 148, to make sure that it is still valid, again be sending 'keep alive' data packets between the local and remote computer's connection resource managers.

Figure 7:
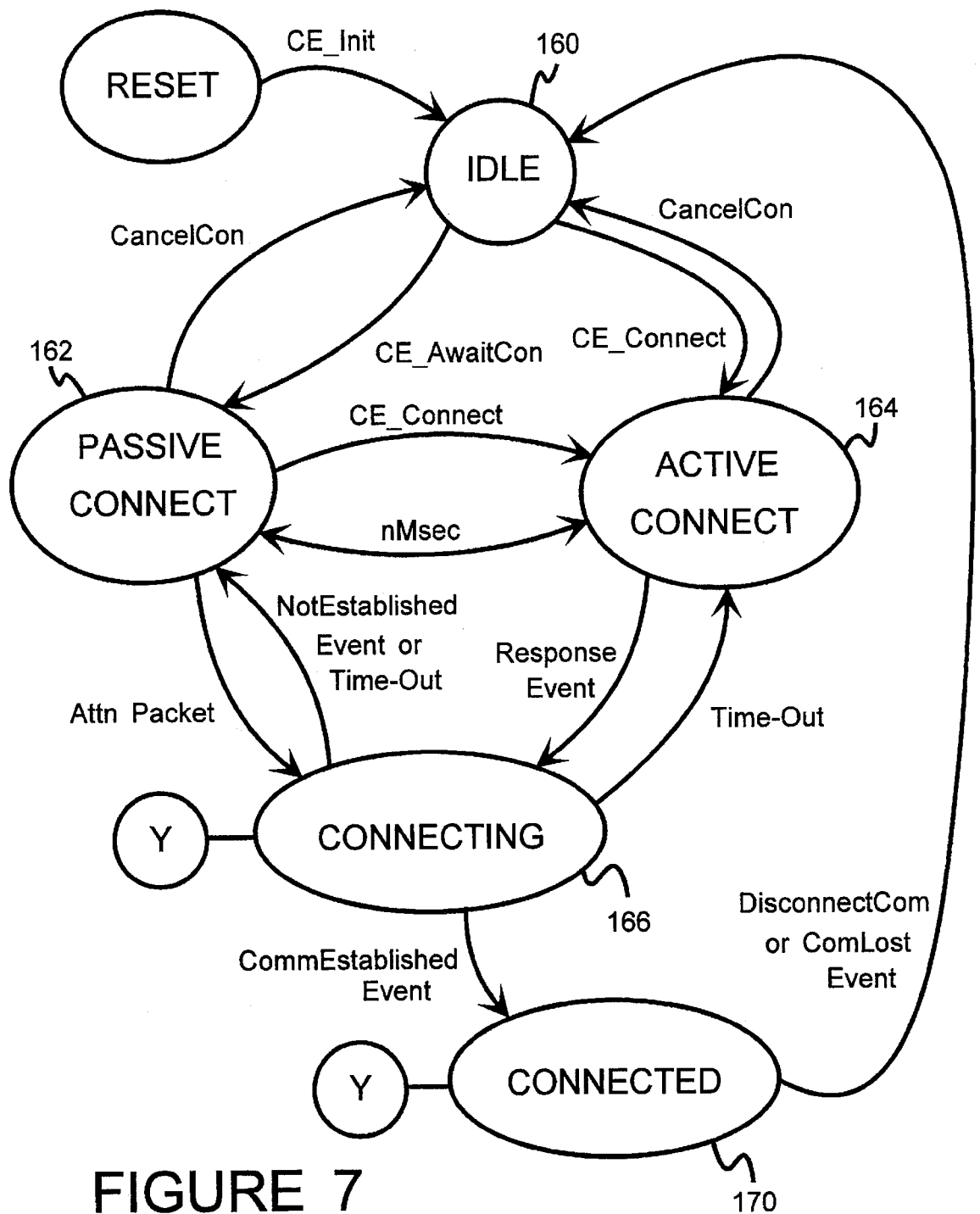
FIG. 7 highlights how the low-level connection is made by the connection state machine in the connection establish module.

Low-Level Connection State Machine—FIG. 7

FIG. 6 has described establishing both the high and low-level connection using the link state machine in CRM control 124. FIG. 7 highlights how the low-level connection is made by the connection state machine in connection establish module 104. This low-level connection state machine is called by the high-level link state machine after the communications port has been configured when a physical connection is to be made.

The state machine must be initialized after reset by calling the CE_Init API function. This is a proprietary API function defined for the interface between connection resource manager 100 and connection establish module 104. These proprietary API functions are described in more detail in the Appendix. All other functions return an error if called before the CE_Init function is called. Idle state 160 is then entered, indicating that an active connection has not been defined. The CE_AwaitCon function causes passive connect state 162 to be entered, while the CE_Connect function sequences the state machine from either idle state 160 or passive connect state 162 to active connect state 164. The CE_CancelCon function returns the state machine to idle state 160 from either passive connect state 162 or active connect state 164.

In passive connect state 162, the portable-computer link program passively waits for an attention packet to be sent over the link media to its local communications port from the remote machine. When the transmission of this attention packet is detected a callback is generated by the lower-level Windows comm SSI 108 which is sent to connection establish module 104. This callback is device-dependent, and may be generated the ring indicator (RI) or carrier detect (CD) from a modem, or detection of a strobe for a parallel port or a data change in a serial port. Connection state 166 is then entered. Any error in this packet returns the state machine to passive connect state 162.

In active connect state 164, an attention packet is periodically transmitted over the configured communications port. A response event occurs when the remote computer is in passive connect state 162 and receives the attention packet and transmits back a response packet. For a modem, the response event is a carrier detect (CD) signal from the modem. The response event triggers the transition from active connect state 164 to connecting state 166. If a proper response packet is not received within a time-out period of time, then the state machine returns to active connect state 164 from connecting state 166.

If a passive_retry bit in the CE_DEV data structure is set, then the state machine transitions from passive connect state 162 to active connect state 164 every x milliseconds, where x is also defined in the data structure. If no response occurs while in active connect state 164, then the state machine transitions back to passive connect state 162. Passive retry allows a local and remote computer to connect to one another even when both are nominally in the passive connect state and neither is defined as the active connector.

If the connection is made, and the attention and response packets are successfully transmitted and received, then the state machine transitions from connecting state 166 to connected state 170. The high-level link state machine in connection resource manager 100 is signaled so it can next attempt to establish a high-level link and then allow file transfer to occur. The low-level connection establish state machine of FIG. 7 remains in connected state 170 until the CE_Disconnect function is called, or a connection lost event occurs, and the state machine returns back to idle state 160. For a modem, the loss of the carrier detect (CD) signals the connection lost event. Failure of the remote PC to respond to a keep-alive packet also causes a connection lost event.

MAPPING PROGRESS OF LINK STATUS TO ICONIC STATES—FIGS. 6, 7

The high-level connection resource manager 100 is notified when certain states of connection state machine in connection establish module 104 are entered. Notification occurs by a registered callback function in the proprietary API. A callback routine is registered when these states are entered. The higher-level calling routine, in this case the connection resource manager 100, fields calls to this registered routine and reads the callback routine parameters to read the message from the connection establish module 104 indicating which event occurred or which state was entered.

The following events and state transitions cause the callback routine to notify connection resource manager 100:

ATTEMPT_CONNECT: An attention packet is being transmitted or the modem is being dialed.

NO_RESPONSE: No response packet was received after the attention packet was sent.

CONNECTING: An attention event occurred and a connection is being negotiated.

CONNECTED: Both the attention and response packets have been successfully sent and received.

CONNLOST: The connection has been lost.

This notification of connection resource manager 100 by connection establish module 104 allows the progress of the connection establishment to be monitored. This notification information is decoded into three status levels—red, yellow, and green, and a transition to a different level sends a 'change light' signal to traffic light controller 112. FIGS. 6 and 7 also show the state of the dynamic traffic light icon at various points within the high and low-level state machines. Thus the yellow light occurs when the low-level connection is being established, and specifically when the attention packet is sent or received.

DATA STRUCTURES

Figure 8:
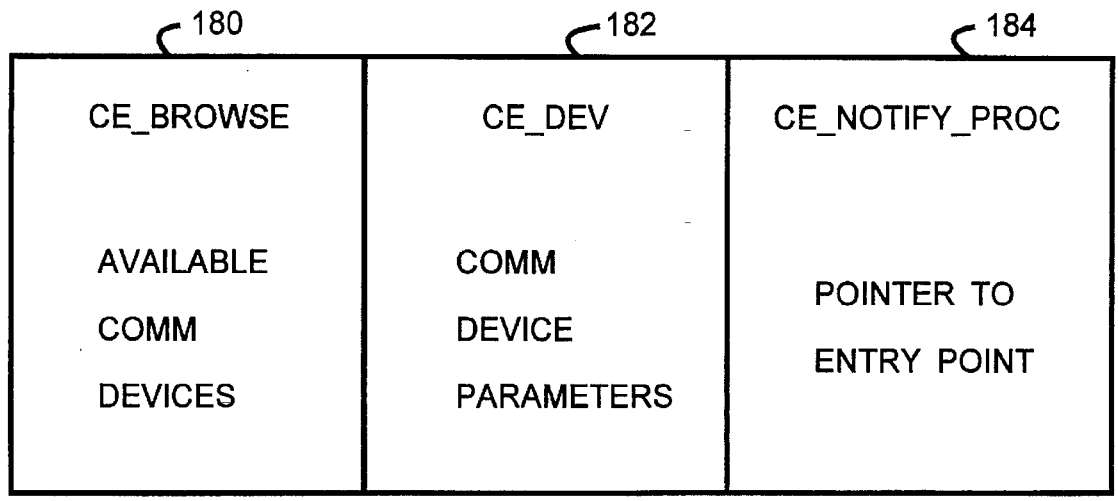
FIG. 8 shows three data structures used by the connection establish module for communicating with the higher-level connection resource manager.

FIG. 8 shows data structures used by connection establish module 104 for communicating with the higher-level connection resource manager 100. Linked-list data structures are preferred, with each record having an address pointer to the next record in the linked list, or an end-of-list marker. CE_BROWSE 180 enumerates the available communications devices, and to define parameters for each device. Up to four serial ports (COM1:4) and three parallel ports (LPT1:3) may be defined. Any of the serial ports may be configured for modem or IR transmission by specifying additional parameters. CE_DEV 182 is a second, more complex data structure specifying additional parameters for some of the devices configured in CE_BROWSE 180. For example, the DTR/DSR (Data Terminal Ready/Data Send Ready), ready/clear-to-send (RTS/CTS), or XON/XOFF software flow control protocols may be specified. CE_BROWSE 180 is designed to be a smaller structure for easy look up of which ports are configured, while CE_DEV specifies in great detail the configuration of these ports.

CE_NOTIFY_PROC 184 is a pointer to the entry point where messages and notifications for the callback routine are located for the callback between connection establish module 104 and connection resource manager 100.

DETAILED LINK STATUS INFORMATION

The user may double-click on traffic light icon 10 with the mouse and a detailed status dialog box appears on display 20. The detailed dialog box gives the user greater detail of the current status. This detail can be the notification message last received from connection establish module 104. It may also include additional text giving suggestions on how to configure the communications ports or how to physically connect the link media.

TRAFFIC LIGHT ICON IS DYNAMIC

The traffic light icon 10 is a dynamic rather than a static icon. Icon 10 changes appearance to show the progress of making the connection. Since it may take several minutes to make the connection, as when a modem is used, the user must be given feedback on the status so he won't think that the program has crashed. The traffic light icon provides this feedback with the yellow light state, indicating that the connection has not been completed yet.

Static icons are commonly used in commercial programs. These static icons do not change appearance and are merely used as a software 'button' that the user may mouse-click on. For example, double-clicking on the control panel icon in Microsoft Windows™ starts the control panel program, and further clicks on icons in the control panel program adjust settings on the computer such as display colors. The control panel icon is static and does not change appearance.

Early text-based versions of CompuServe's™ information manager program had the user type in a 'GO' command followed by a keyword. The GO command moves the user into the service designated by the keyword. A newer Windows versions of CompuServe's™ program, (WinCIM™), replaces the GO command with a static green traffic light icon on a graphical toolbar. When a user clicks on this static icon, which always has the green light highlighted, a dialog box is displayed where the user can enter a 'GO' keyword. The GO keyword moves the user to that service. For example, if the user enters 'WORK' as the GO keyword, then the working-at-home forum is entered. Thus the traffic light icon is staticly used for the word 'GO'. However, the present invention uses a dynamic rather than a static icon. The dynamic icon indicates the progress of establishing the communications link.

Another software program which uses an icon of a stoplight is Hewlett Packard's JetAdmin software for Windows 95. This program manages printers, especially printers on a network. In early demonstration versions of the software, the stoplight icon displays red for a failure or error and green when the printers are online and ready.

ALTERNATE EMBODIMENTS

Figure 9A:
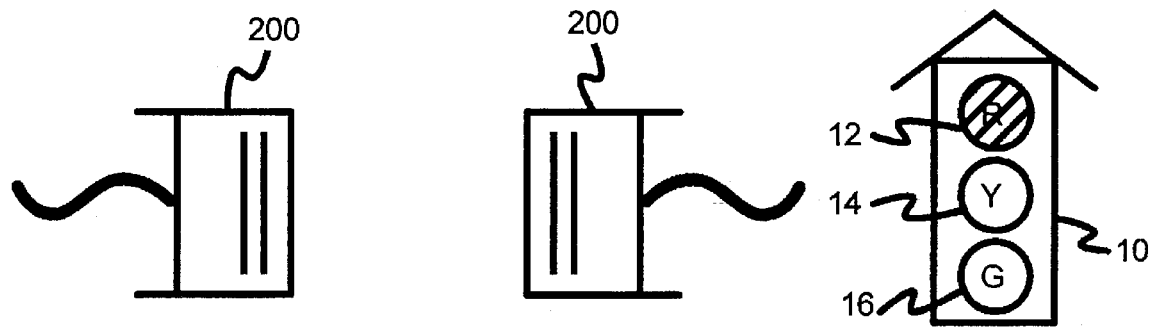
FIGS. 9A, 9B, 9C show an alternate embodiment for the dynamic iconic display of the link status.
Figure 9B:
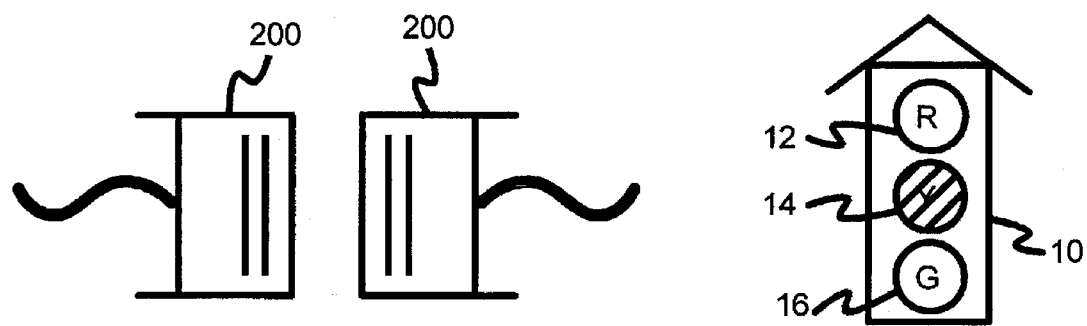
Figure 9C:
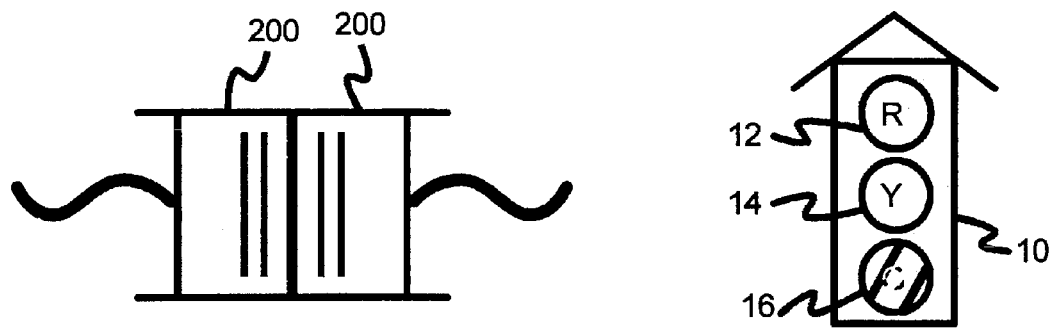

FIGS. 9A, 9B, 9C show an alternate embodiment for the dynamic iconic display of the link status. Icon 10 still displays the stoplight having red, yellow, or green lights brightly lit to indicate link status to the user. This icon 10 is re-inforced with a second iconic representation depicting two cables being plugged together. In FIG. 9A, the stoplight icon 10 has red light 12 brightly lit, indicating no link activity. Cable connector icons 200 are far apart, also indicating that no connection, not even a partial one, has been made. FIG. 9B shows yellow light 14 brightly lit in icon 10, indicating that a connection is being made and some data activity is present. This is re-inforced by cable connectors 200 being moved closer together than in FIG. 9A, but not touching each other. Finally, FIG. 9C shows the green light 16 brightly lit, and cable connectors 200 touching each other, indicating that a complete link has been made.

A fourth state may be used in which none of the lights are lit. The cable and plugs are not displayed in this fourth state. This fourth, no-light state may be displayed before any links are configured, during steps 130, 132 of FIG. 6.

While the traffic light is universally known, the exact appearance of the traffic light may vary in different regions. In the United States, the traffic light typically has the three colors of lights in a vertical orientation, with red on the top and green on the bottom. However, in Canada and other parts of the world the lights may be arranged horizontally—with the red and green lights to the left and right of the yellow light. The icon may easily be modified from the vertical orientation described herein to a horizontal orientation for international versions of the software.

Cable connector icons 200 are preferably about the same size as stoplight icon 10, and located on the display screen near to stoplight icon 10. Of course, the exact size and placement can be varied. Other embodiments replace cable connectors 200 with telephone or modem icons when a modem is used for the communications port. For IR links, lightning bolt icons between two stationary IR module icons can be used to indicate when a connection is made or attempted.

Several other embodiments are contemplated by the inventors. For example, the invention has been described as being used to transfer files between computers, although electronic mail (e-mail), notes, and other information may be transferred as well. The communications link may be used to remotely control from a remote portable computer an application program running on the desktop computer.

While a remote computer has been described, a remote peripheral could also be connected over the communications port. The remote peripheral could be a shared printer or disk file system. Multiple ports may be configured and used for communications and file transfers. Additional high and low-level state machines are set up for each additional communications port.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

APPENDIX—PROPRIETARY API FUNCTIONS

CE API Functions—Summary

Initialize Internal State (API function PLCE_Init)
Register a Callback Routine (API function PLCE_RegisterCallback)
Initiate and Establish an Active Connection (API function PLCE_Connect)
Wait for an Active Connection (API function PLCE_AwaitConnect)
Cancel any pending Connection (API function PLCE_CancelConnect)
Discontinue any Active Connection (API function PLCE_DisConnect)
Return a pointer to list of Comm devices, CE_BROWSE (API function PLCE_EnumerateDevices)

CRM API Functions—Summary

Service Connections

A Service Connection is negotiated between two Client Service providers. A Service Connection between local and remote Client Services requires a Logical Connection. A Service Connection implies that the two connected Client Services have exchanged at least enough data to establish the necesssary operational parameters for the connected Client Services. It is possible to have more than one Service Connection on a single Logical Connection; a Service Connection is a multiplexed client of a Logical Connection.

The CRM provides the following services to Client Services for Service Connection establishment:
ServiceRegister.Request (API function CRM_ServiceRegister)
ServiceUnregister.Request (API Function CRM_ServiceUnregister)
ServicePublish.Request (API function CRM_ServicePublish)
ServicePublish.Confirm (Callback Notification CRMCNF_SRV_PUBLISH)
ServicePublish.Indication (Callback Notification CRMIND_SRV_PUBLISH)
ServiceUnpublish.Request (API Function CRM_ServiceUnpublish)
ServiceUnpublish.Confirm (Callback Notification CRMCNF_SRV_UNPUBLISH)
ServiceUnpublish.Indication (Callback Notification CRMIND_SRV_UNPUBLISH)
ServiceConnect.Request (API Function CRM_ServiceConnectRequest)
ServiceConnect.Confirm (Callback Notification CRMCNF_SRV_CONNECT)
ServiceConnect.Indication (Callback Notification CRMIND_SRV_CONNECT)
ServiceConnect.Response (API Function CRM_ServiceConnectResponse)
ServiceDisconnect.Request (API Function CRM_ServiceDisconnect)
ServiceDisconnect.Indication (Callback Notification CRMIND_SRV_DISCONNECT)
ServiceStatus.Request (API Function CRM_ServiceStatus)

Data Transfer

The CRM provides services for flow-controlled data transfer between Client Services on a Service Connection. The CRM supports compression, and prioritization of the data transmitted. The CRM API provides the following services to Client Services for Service Connection data transfer:
WritePacket.Request (API function CRM_WritePacket)
WritePacket.Confirm (Callback Notification CRMCNF_TXSTATUS)
ClearToSend.Indication (Callback Notification CRMIND_SRV_TXOK)
ReadPacket.Request (API function CRM_ReadPacket)
ReadPacket.Indication (Callback Notification CRMIND_RXPACKET)
CancelPacket.Request (API function CRM_CancelPacket)

Process Control

The CRM provides services to control system processes. The CRM supports task suspension, and guaranteed message delivery regardless of task suspension. The CRM API provides the following services to Client Services for process control:
SuspendTask.Request (API function CRM_SuspendTask)
DeliverMessage.Request (API function CRM_DeliverMessage)
DeliverMessage.Confirm (Callback Notification CRMCNF_MESSAGE)
SetTimer.Request (API Function CRM_SetTimer)
SetTimer.Confirm (Callback Notification CRMCNF_TIMER)
KillTimer.Request (API Function CRM_KillTimer)

We claim:

1. A method for establishing a connection from a local computer to a remote computer comprising the computer-implemented steps of:

displaying to a user an icon on a display screen on the local computer, the icon having a first appearance which is red in color;

configuring a communications port on the local computer, the communications port for coupling to a link media for transferring data between the local computer and the remote computer;

transmitting an attention packet out of the communications port of the local computer and changing the icon to a second appearance which is yellow in color, the second appearance being distinct from the first appearance so as to indicate to the user that a connection attempt is being made;

changing the appearance of the icon to a third appearance which is green in color if a response packet is successfully received at the communications port from the remote computer, the third appearance distinct from the first and second appearance so as to indicate to the user that a connection has been made; but changing the appearance of the icon back to the first appearance if a response packet is not successfully received at the communications port from the remote computer, indicating that no connection has been made, wherein the appearance of the icon progresses from red to yellow to green in color as the connection is established, whereby progress of establishing the connection is displayed to the user by changing the appearance of the icon.

2. The method of claim 1 wherein the connection from the local computer to the remote computer is temporary and the link media is connected to the communications port by an end user, the connection capable of being disconnected and re-established many times in a month.

3. The method of claim 1 wherein the first appearance of the icon is an image of a traffic light with a red light brightened, the second appearance of the icon is an image of a traffic light with a yellow light brightened, and third appearance of the icon is an image of a traffic light with a green light brightened.

4. The method of claim 3 wherein the response packet is successfully received when the response packet contains data in an expected format.

5. The method of claim 4 further comprising the computer-implemented step of:

changing the appearance of the icon from the third appearance to the first appearance when the link media is disconnected from the communications port.

6. The method of claim 5 further comprising the computer-implemented step of:

establishing a high-level link between connection resource manager program modules running on the local computer and running on the remote computer before changing the appearance of the icon from the second appearance to the third appearance.

7. A computer-program product comprising:

a computer-usable medium having computer-readable program code means embodied therein for establishing a connection between a local and a remote computer, the computer-readable program code means in the computer-program product comprising:

connection means for establishing a connection between the local and remote computers, the connection means including means for transmitting an attention packet and means for transmitting a response packet in response to the attention packet;

icon display means for generating an image of an icon for display to a user on a display screen, the image of the icon sequencing from red to yellow to green as a connection is made;

connection progress monitoring means, coupled to the connection means and coupled to the icon display means, for monitoring the progress of establishing the connection and updating the appearance of the icon to indicate to the user the progress of establishing the connection, whereby the image of the icon for display to the user is tightly coupled to the connection means through the connection progress monitoring means, reporting to the user the status of establishing the connection through the updating the appearance of the icon.

8. The computer-program product of claim 7 wherein the icon is an image of a traffic light, the appearance of the icon being updated from a red light to a yellow light when the connection means attempts to make a connection, and the appearance of the icon being updated from the yellow light of a green light when the connection means has established the connection.

9. The computer-program product of claim 8 further comprising:

data transfer means for transferring data contained in files between the local and remote computers, the data contained in the files being transferred only when the icon has the appearance of the green light.

10. The computer-program product of claim 9 wherein the connection progress monitoring means includes callback means for the connection means to send a notification to the connection progress monitoring means when an attention packet is sent or received, the notification requesting that the connection progress monitoring means read a message in memory written by the connection means, the message indicating the progress of establishing the connection.

11. The computer-program product of claim 10 wherein the icon display means instructs a Windows Graphics Device Interface (GDI) module to update the appearance of the icon, the Windows GDI module writing an updated image of the icon into a frame buffer, the updated image of the icon being displayed to the user on the display screen after a next screen refresh from the frame buffer.

12. The computer-program product of claim 11 wherein the connection means uses a Windows Communications System Services Interface (SSI) application programming interface (API) to open and close a communications port, but uses the data transfer means to read and write data to the communications port, the data transfer means being separate from the Windows Communications SSI API.

13. The computer program product of claim 12 wherein the computer-usable medium having the computer-readable program code means embodied therein is selected from the group consisting of a diskette, a CD-ROM, and a hard disk.

14. The computer-program product of claim 13 wherein the computer-readable program code means is compressed onto the computer-usable medium and is de-compressed before execution on a computer.

15. A programmable apparatus directed by a computer program, the apparatus comprising:

display means for displaying an icon to a user on a display screen;

a connection resource manager in the computer program, the connection resource manager signaling the display means to change a graphical appearance of the icon from red to yellow to green as a connection is made to indicate the progress of establishing a communications link;

a connection establisher in the computer program, for establishing the communications link and notifying the connection resource manager of the progress in establishing the communications link;

memory means for storing at least a portion of the computer program; and processor means, coupled to the memory means, for executing instructions in the computer program;

whereby the progress of establishing the communications link is reported to the user by the changing graphical appearance of the icon.

16. The programmable apparatus of claim 15 wherein the icon is a graphical image of a traffic light, the appearance of the icon being updated from a red light to a yellow light when the connection establisher attempts to make a link, and the appearance of the icon being updated from the yellow light of a green light when connection establisher has established the link.

17. The programmable apparatus of claim 15 wherein the communications link is established over a parallel-port cable.

18. The programmable apparatus of claim 15 wherein the communications link is established over a serial-port cable.

19. The programmable apparatus of claim 15 wherein the communications link is established over a modem.

20. The programmable apparatus of claim 15 wherein the communications link is established over an Infrared (IR) data link.

* * * * *